United States Patent
Lowchareonkul

(10) Patent No.: US 9,263,775 B1
(45) Date of Patent: Feb. 16, 2016

(54) EXTERNAL BATTERY FOR MOBILE DEVICES WITH INTELLIGENT DISPLAY

(71) Applicant: Paul Lowchareonkul, Los Altos Hills, CA (US)

(72) Inventor: Paul Lowchareonkul, Los Altos Hills, CA (US)

( * ) Notice: Subject to any disclaimer, the term of this patent is extended or adjusted under 35 U.S.C. 154(b) by 259 days.

(21) Appl. No.: 13/712,901

(22) Filed: Dec. 12, 2012

(51) Int. Cl.
*H01M 10/48* (2006.01)
*H01M 10/42* (2006.01)
*H05K 13/00* (2006.01)

(52) U.S. Cl.
CPC .......... *H01M 10/425* (2013.01); *H01M 10/486* (2013.01); *H01M 10/488* (2013.01); *H05K 13/0023* (2013.01)

(58) Field of Classification Search
CPC . H01M 6/505; H01M 10/425; H01M 10/486; H01M 10/488
USPC ............................................................ 429/8
See application file for complete search history.

(56) References Cited

U.S. PATENT DOCUMENTS

| | | | | |
|---|---|---|---|---|
| 5,903,137 | A | * | 5/1999 | Freiman et al. ............... 320/163 |
| 6,174,617 | B1 | * | 1/2001 | Hiratsuka et al. ............... 429/90 |
| 2009/0160452 | A1 | * | 6/2009 | Meyer ............................ 324/434 |
| 2012/0025744 | A1 | * | 2/2012 | Kim et al. ...................... 318/139 |
| 2012/0262109 | A1 | * | 10/2012 | Toya et al. ..................... 320/108 |

* cited by examiner

*Primary Examiner* — Nicholas P D'Aniello
(74) *Attorney, Agent, or Firm* — R&D Patent Attorneys

(57) ABSTRACT

Battery pack with intelligent display and methods to make various types of a battery pack with an intelligent display for the benefit of a user. One embodiment is a method of making a battery pack with intelligent display. A second embodiment is a battery pack with intelligent display that can display one or more parameters, such as charge remaining, current out, current in, watts out, watts in, time remaining, time to recharge one or more batteries, battery temperature, battery voltages, the age of the battery, and clock time.

20 Claims, 17 Drawing Sheets

EXTERNAL BATTERY FOR MOBILE DEVICES WITH INTELLIGENT DISPLAY

BACKGROUND OF THE INVENTION

1. Field of the Invention

This invention relates generally to the field of battery packs, and more specifically to providing battery packs with displays.

2. Description of the Prior Art

Battery packs have been known and used for many years, but such battery packs have been limited in their usefulness.

The biggest problem with the prior art external battery packs is that they do not indicate precisely when the battery will run out. There are prior art battery packs that have LED indicators to give a general approximation when the battery will be drained. These lights are unintelligent and do not give the user valuable information about the battery. The prior art battery packs provide an approximate indication that is not accurate and the indication is from simply measuring the voltage of the battery. By knowing the precise amount of how much charge is remaining in the battery pack, and the actual current draw (in and out) of the battery pack, the user gains a much better idea of their battery status.

SUMMARY OF THE INVENTION

The present invention provides methods to manufacture a battery pack with an intelligent display and implementations of battery packs with intelligent displays. Embodiments of the invention can be implemented in numerous ways. Three aspects of the invention are described below.

A first aspect of the invention is directed to a method to make a battery pack with intelligent display. The method includes placing a substrate inside a battery pack enclosure; attaching one or more batteries to the substrate; coupling a current detection circuit to the one or more batteries; coupling a DC-DC converter and a port connector to the current detection circuit; coupling a microprocessor/micro-controller and one or more analog to digital converters to the current detection circuit; installing at least one display coupled to the microprocessor/micro-controller and installing one or more buttons, and coupling the display to the one or more buttons; and attaching all the components to the enclosure to assemble a complete unit.

A second aspect of the invention is directed to a battery pack with intelligent display. The battery pack with intelligent display includes a substrate inside a battery pack enclosure; one or more batteries attached to the substrate; a current detection circuit coupled to the one or more batteries; a DC-DC converter and a port connector coupled to the current detection circuit; a microprocessor/micro-controller and one or more analog to digital converters coupled to the current detection circuit; at least one display coupled to the microprocessor/micro-controller; and one or more buttons in the battery pack enclosure, wherein the one or more buttons are coupled to the display and microprocessor/micro-controller.

A third aspect of the invention is directed to a method of making a battery pack with intelligent display. The method of making a battery pack with intelligent display includes placing a substrate inside a battery pack enclosure; attaching one or more batteries to the substrate; coupling a current detection circuit to the one or more batteries; coupling a DC-DC converter and a port connector to the current detection circuit; coupling a microprocessor/micro-controller and one or more analog to digital converters to the current detection circuit; installing at least one display coupled to the microprocessor/ micro-controller; installing one or more buttons, and coupling the one or more buttons to the display; and attaching all the components to the enclosure to assemble a complete unit.

BRIEF DESCRIPTION OF THE DRAWINGS

Non-limiting and non-exhaustive embodiments of the invention are described with reference to the following figures or drawings.

DETAILED DESCRIPTION OF THE PREFERRED EMBODIMENTS

Figure 1:
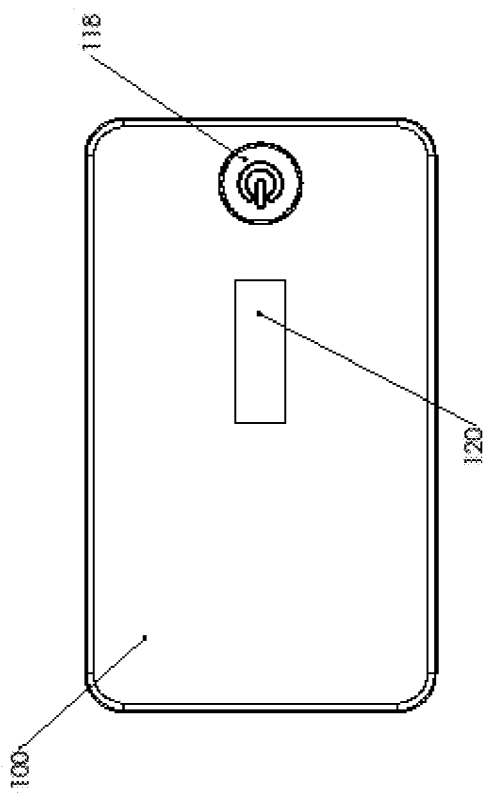
FIG. 1 illustrates a top view of a battery pack with intelligent display, in accordance with one embodiment of the invention.

Embodiments of the inventions can be constructed from off-the-shelf components. In all of the embodiments disclosed below, different materials could be used for the battery pack with intelligent display, including but not exclusively: various plastics, resins, papers, fabrics, plant fibers, ceramics, and metals. The metal pieces would typically be made from a metal or some metal alloy, but could alternatively be made from other resilient materials, such as plastics, and other equivalent manmade materials. One embodiment of the invention can be also be used in addition to any personal electronics, including a MP3 player, an iPod Shuffle, a radio receiver, an optical disc player, a magnetic disc player, a cellphone, smartphone, or an equivalent device.

In various embodiments, the intelligent display can show one or more of the following types of information. Table 1 provides examples of information that can be shown on the intelligent display.

TABLE 1

| | |
|---|---|
| 100% Charge Remaining - This is calculated from the known charge in mAh remaining in the battery divided by the total battery capacity | 4503 mAh - This shows the actual amount of charge remaining in the battery. |
| 300 mA Current Out - This shows the actual current being supplied to an external mobile device. | 500 mA Current In - This shows the actual charge current being supplied into the battery pack |
| 2.01 Watts Out - This shows the actual power being supplied to an external mobile device. | 4.12 Watts In - This shows the actual charge power being supplied into the battery pack |
| 2 h 20 min Remaining - This shows the exact time when the battery will run out if it is connected to one or more mobile devices. This time is derived from calculating the known amount of charge remaining, divided by the current out. | 1 h 10 min to Full - This shows the exact time left to charge the battery pack. This time is derived from calculating the known amount of charge when the battery pack is full, subtracting this with the actual amount of charge remaining and dividing by the amount of current in. |
| 50 Deg C. of F - The battery temperature is also monitored to correct for temperature variation of the battery pack to account for shifts in measured current, voltage, capacity, etc. | 3.76 volts - Indicates the voltage of the battery |
| 1 yr 35 Days - Indicates the age of the battery pack. By determining the age, it would be possible to also correct for decreased battery capacity over time, for example a decrease of about 1-5% every year. | Battery degradation in percentage or in milliampere hours (mAh). |

Components

In various embodiments, the battery pack with intelligent display includes one or more of the following types of components. Table 2 provides a list of components for one embodiment of the invention as shown in the following figures, but alternative embodiments can have a subset of the following components.

TABLE 2

| | |
|---|---|
| Enclosure 100. | In one embodiment this could be a plastic enclosure that has a top and bottom used to house all the electronics inside the product. |
| Connector 102. | In various embodiments this could be a port (e.g., USB Male A, FireWire, or equivalent connector) used to plug in a cable (e.g., USB, FireWire, or an equivalent) to the battery pack to charge the mobile device. In one embodiment this port outputs 5 volts DC. |
| Connector 104. | In one embodiment this could be a mini USB or round power plug used to connect 18 volts DC to 5 volts DC to charge the lithium battery. |
| Substrate 106. | A substrate (e.g., a printed circuit board, or equivalent) used to mount all the electronic components. |
| One or more batteries 108. | In one embodiment this can be one or more lithium polymer batteries 3.7 V (But in alternative embodiments this can be any type of battery). |
| DC-DC converter 110. | In one embodiment it would convert the battery voltage to a stable 5 V for a USB port. |

TABLE 2-continued

| | |
|---|---|
| Charger circuit 112. | Used to regulate the incoming voltage (e.g., 5 V) to charge the lithium battery. |
| Current detection circuit 114. | In one embodiment this includes a small precision resistor, one embodiment uses a 0.05-0.1 Ohm resistor. By measuring the voltage across this resistor (both positive and negative), one embodiment of the invention can precisely determine the actual amount of current that flows in and out of the battery (e.g., such as a lithium battery). |
| Microprocessor or micro-controller 116. | In one embodiment, it has analog to digital converters built-in to detect the voltage across the current detection circuit. In one embodiment the microprocessor/micro-controller also has digital input and output ports to control the display graphics, enabling the battery charger, dc-dc converter, and buttons for user input. |
| Buttons 118. | In one embodiment, the buttons can be push buttons or capacitive sense touch buttons. In one embodiment the buttons can be used to toggle the views and turn on and off the battery pack. |
| Substrate button 119. | |
| Display 120. | In various embodiments, the display can be an OLED, flexible OLED, LED, LCD, dot matrix, character, or equivalent display used to show one or more parameters about the status of the batteries and other info. |

Various embodiments of the invention can utilize a display that is commercially available from the following manufacturers—LG Electronics Inc., with corporate headquarters in Seoul, South Korea; Samsung, with corporate headquarters in Seoul, South Korea; and Chi Mei Electronics, with corporate headquarters in Hong Kong, China. Various embodiments of the invention can utilize a micro-controller that is commercially available from the following manufacturers—Microchip Technology Inc., with corporate headquarters in Chandler, Ariz.; and Cypress Semiconductor, with corporate headquarters in San Jose, Calif.

Various embodiments of the invention can utilize power circuits that are commercially available from the following manufacturers—Texas Instruments Inc., with corporate headquarters in Dallas, Tex.; Linear Technology, with corporate headquarters in Milpitas, Calif.; Maxim Integrated, with corporate headquarters in San Jose, Calif.; and Microchip Technology Inc., with corporate headquarters in Chandler, Ariz. Various embodiments of the invention can utilize connectors that are commercially available from the following manufacturers—Molex Inc., with corporate headquarters in Lisle, Ill.; 3M Company, with corporate headquarters in Maplewood, Minn.; and Panasonic, with corporate headquarters in Osaka, Japan. Various embodiments of the invention can utilize batteries that are commercially available from the following manufacturers—Dongguan Kanyo Battery Technology Co LTD., with corporate headquarters in Guangdong, China; and Unitech Battery Limited, with corporate headquarters in Shenzhen City, China.

In various embodiments of a battery pack with intelligent display shown below, an intelligent display can be implemented by liquid crystal display (LCD), organic light emitting diode (OLED) display, flexible OLED display, light emitting diode (LED) display, dot matrix display, segmented display, character display, or an equivalent display technology. In various embodiments, the intelligent display can display one or more of the following: battery charge level, estimated remaining battery life, battery degradation in percentage or in milliampere hours (mAh), clock time, and/or equivalent parameters (e.g., as shown in Table 1 above). In various embodiments, any of the above information can be represented on the display in graphical form, graphic form, plot form, character form, numeric form, or plot form, or in any combination. In various embodiments, there is a user interface that allows the user to switch between views by toggling one or any buttons. In various embodiments, the buttons can be mechanical push buttons, switches, capacitive sense, touch screen or any equivalent type of human interface method to capture user input.

Various embodiments of the invention can have varying sizes of batteries, capacities, and battery technology types (e.g., lithium polymer, lithium ion, or any equivalent chemical storage medium). Various embodiments of the invention can have one or more outputs to charge one or more devices. In various embodiments, the data can be displayed by connecting by wireless or wire connectivity to smartphones, tablet computers, personal computers (PCs), or equivalents. In one embodiment the data can be sent to a smartphone app to view all the data. Various embodiments of the invention can thus use an external display to avoid having the need for a display built into the product.

Various embodiments of the invention can have varying output voltages, for example 5.0 volts, 3.3 volts, etc. Various embodiments of the invention can have various output plugs (e.g., USB, FireWire and equivalents) and just not limited to USB male A. Various embodiments of the invention can have various input plugs to accommodate different formats of charging the battery pack. Various embodiments of the invention can have a rubber seal around the mating top and bottom of the enclosure to make the enclosure water tight, and water resistant Microprocessor/Micro-Controller Calculations Some embodiments of the invention can have a microprocessor or a micro-controller that will be able to determine at any given time the rate of current draw going in and out of the battery. By knowing the sampling time, (variable or fixed), various embodiments of the invention can determine how much charge or discharge in milliampere hours (mAh) the battery has charged or drained during that time. Various embodiments of the invention with a higher sampling rate will give a more accurate calculation.

FIG. 1 illustrates a battery pack with intelligent display, in accordance with one embodiment of the invention. FIG. 1 shows a battery pack enclosure 100 (with a top and bottom part), one or more buttons 118, and display 120.

Figure 2:
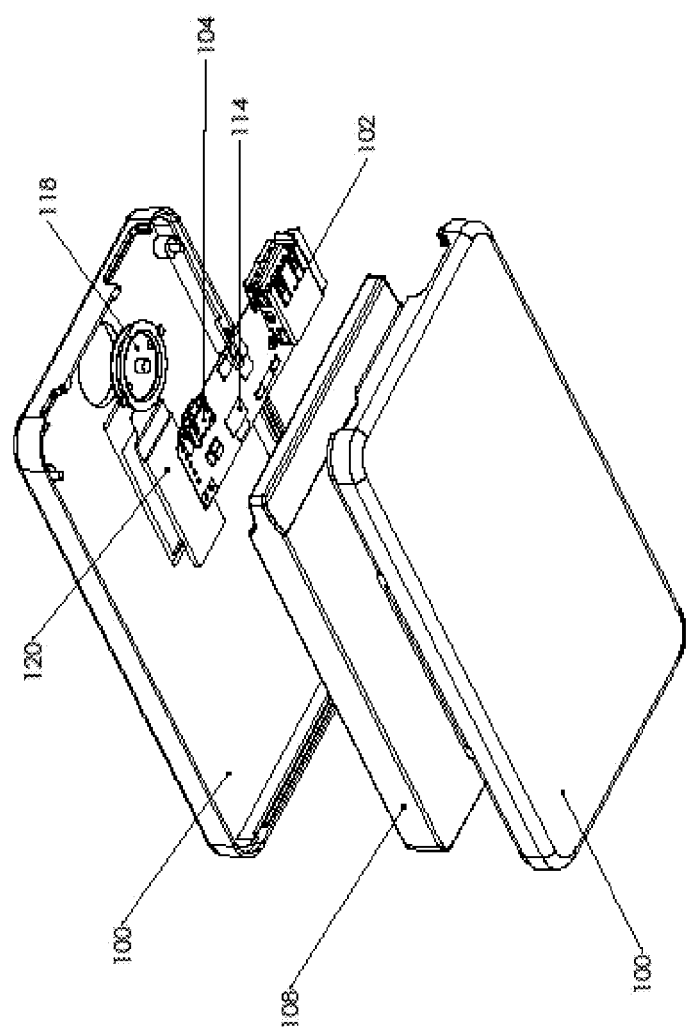
FIG. 2 illustrates an isometric bottom view of a battery pack with intelligent display, in accordance with one embodiment of the invention.

FIG. 2 illustrates an isometric bottom view of a battery pack with intelligent display, in accordance with one embodiment of the invention. FIG. 2 shows a battery pack enclosure 100, connector 102, connector 104, one or more batteries 108, current detection circuit 114, microprocessor/micro-controller 116, one or more buttons 118, and display 120.

In one embodiment the battery pack enclosure 100 could be a plastic enclosure that has a top and bottom used to house all the electronics inside the product. In one embodiment there could be a connector 102 (e.g., a USB Male A connector) used to plug in a USB cable to the battery pack to charge the mobile device. In one embodiment this connector outputs 5 volts DC. In one embodiment the connector 104 could be a mini USB or round power plug used to connect 18 volts DC to 5 volts DC to charge the battery (e.g., lithium battery or equivalent chemical storage).

The substrate 106 (e.g., a printed circuit board, or equivalent) is used to mount all the electronic components. The one or more batteries 108 in one embodiment can be one or more 3.7 volt lithium polymer batteries (but in alternative embodiments the batteries can be any type of battery). The DC-DC converter 110 in one embodiment would convert the battery voltage to a stable 5 volts for a port connector (e.g., USB, FireWire, or an equivalent). The charger circuit 112 is used to regulate the incoming voltage (e.g., 5V) to charge the one or more batteries (e.g., one or more lithium batteries, or equivalent batteries).

In one embodiment the current detection circuit 114 includes a small precision resistor, one embodiment uses a current sense resistor in the resistance range of 0.02-0.1 Ohm. By measuring the voltage across this resistor (both positive and negative), one embodiment of the invention can precisely determine the actual amount of current that flows in and out of the battery (e.g., such as a lithium battery). The microprocessor/micro-controller 116 in one embodiment has analog to digital converters built-in to detect the voltage across the current detection circuit. In one embodiment the microprocessor/micro-controller 116 also has digital input and output ports (not shown) to control the display graphics, enabling the battery charger, dc-dc converter, and buttons for user input.

In one embodiment, the one or more buttons 118 can be push buttons or capacitive sense touch buttons. In one embodiment the buttons can be used to toggle the views and turn on and off the battery pack. In one embodiment, the display 120 could be an OLED display, a LED display, or a LCD display used to show one or more parameters about the status of the batteries.

Figure 3:
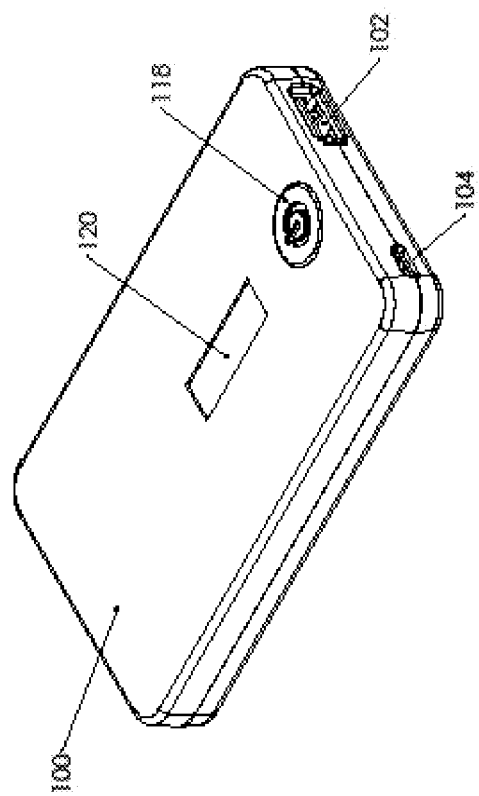
FIG. 3 illustrates an isometric view of a battery pack with intelligent display, in accordance with one embodiment of the invention.

FIG. 3 illustrates an isometric view of a battery pack with intelligent display, in accordance with one embodiment of the invention. FIG. 3 shows a battery pack enclosure 100, connector 102, connector 104, one or more buttons 118, and display 120.

Figure 4:
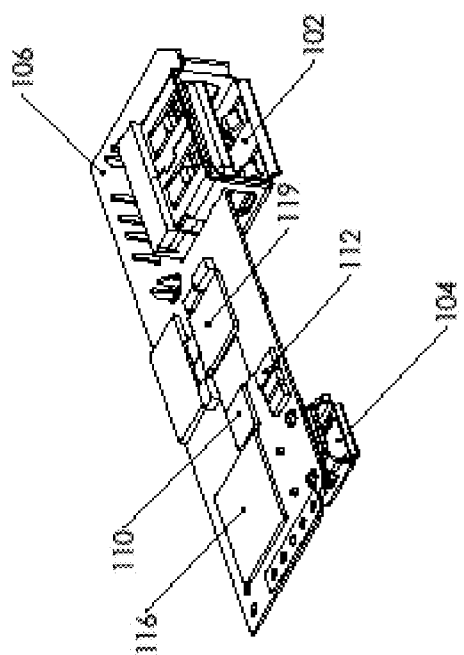
FIG. 4 illustrates an isometric view of the substrate of a battery pack with intelligent display, in accordance with one embodiment of the invention.

FIG. 4 illustrates an isometric view of the substrate of a battery pack with intelligent display, in accordance with one embodiment of the invention. FIG. 4 shows a connector 102, connector 104, substrate 106, DC-DC converter 110, charger circuit 112, current detection circuit 114, microprocessor/micro-controller 116, one or more buttons 118, and substrate button 119.

Figure 5:
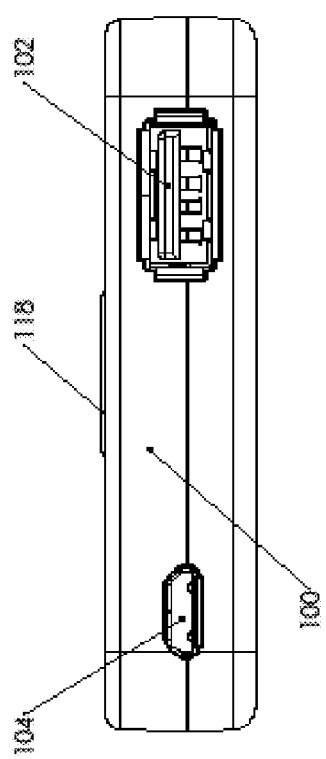
FIG. 5 illustrates a front view of a battery pack with intelligent display, in accordance with one embodiment of the invention.

FIG. 5 illustrates a front view of a battery pack with intelligent display, in accordance with one embodiment of the invention. FIG. 5 shows a battery pack enclosure 100, connector 102, connector 104, and one or more buttons 118.

Figure 6:
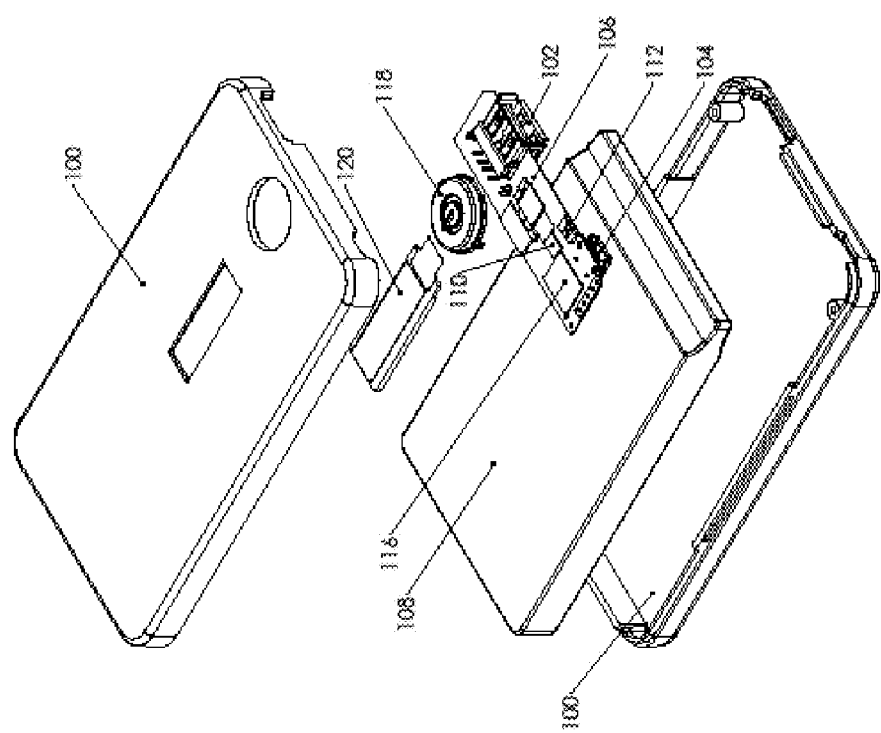
FIG. 6 illustrates an exploded isometric view of a battery pack with intelligent display, in accordance with one embodiment of the invention.

FIG. 6 illustrates an exploded isometric view of a battery pack with intelligent display, in accordance with one embodiment of the invention. FIG. 6 shows a battery pack enclosure 100, connector 102, connector 104, substrate 106, one or more batteries 108, DC-DC converter 110, charger circuit 112, current detection circuit 114, microprocessor/micro-controller 116, one or more buttons 118, and display 120.

Figure 7:
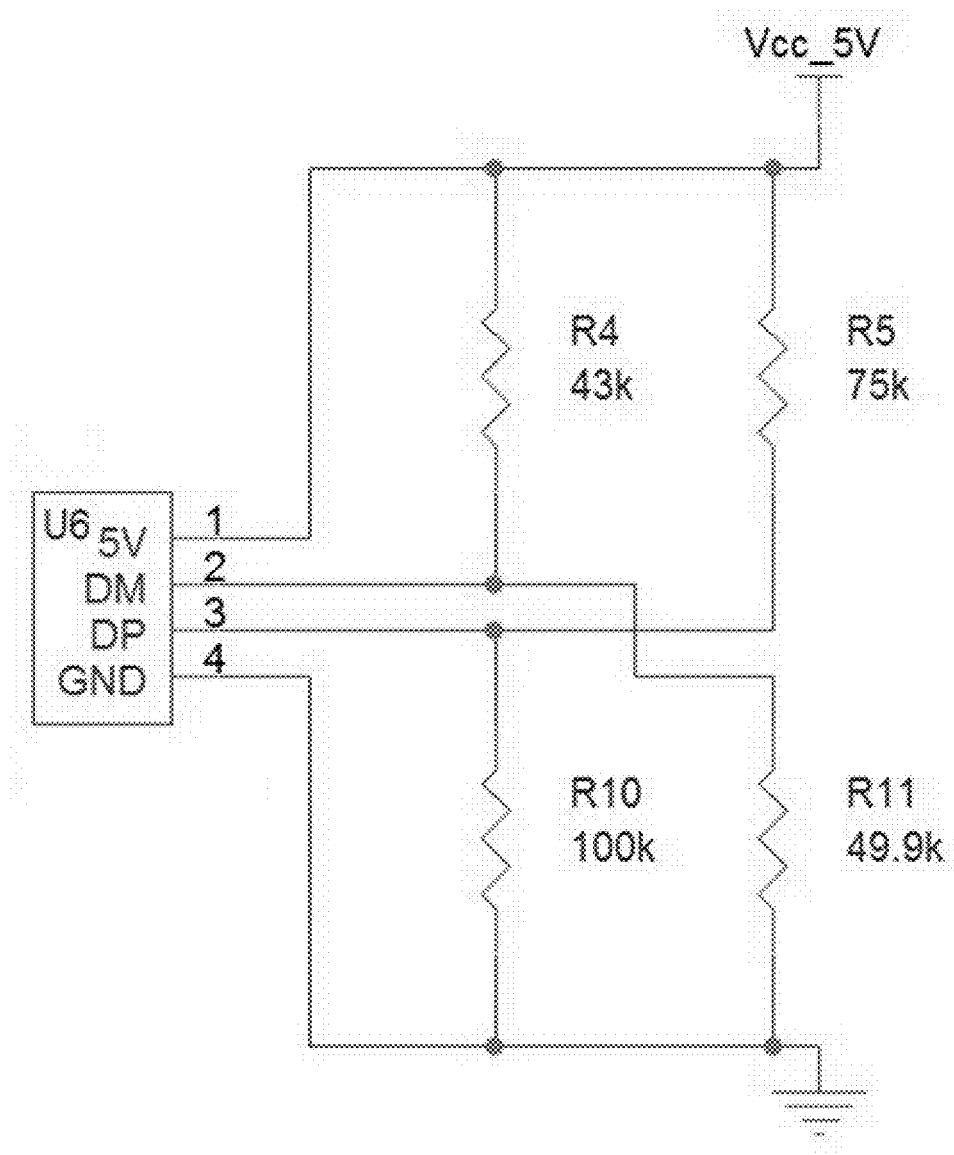
FIG. 7 illustrates a USB out to device circuit, in accordance with one embodiment of the invention.

FIG. 7 illustrates a USB out to device circuit, in accordance with one embodiment of the invention. This is only one illustrative example of such a circuit, because other embodiments of this circuit could be implemented for other types of port connectors (e.g., FireWire, or an equivalent connector), or with other components and/or component values and/or voltages. This particular circuit includes a USB Male A connector U6 coupled to resistors R4 and R5 that are each respectively coupled to Vcc, and coupled to resistors R10 and R11 that are each respectively coupled to ground. In one embodiment, R4 has a resistance for 43 kiloOhms, R5 has a resistance of 75 kiloOhms, R10 has a resistance of 100 kiloOhms and R11 has a resistance of 49.9 kiloOhms, but other embodiments can have larger or smaller resistances.

Figure 8:
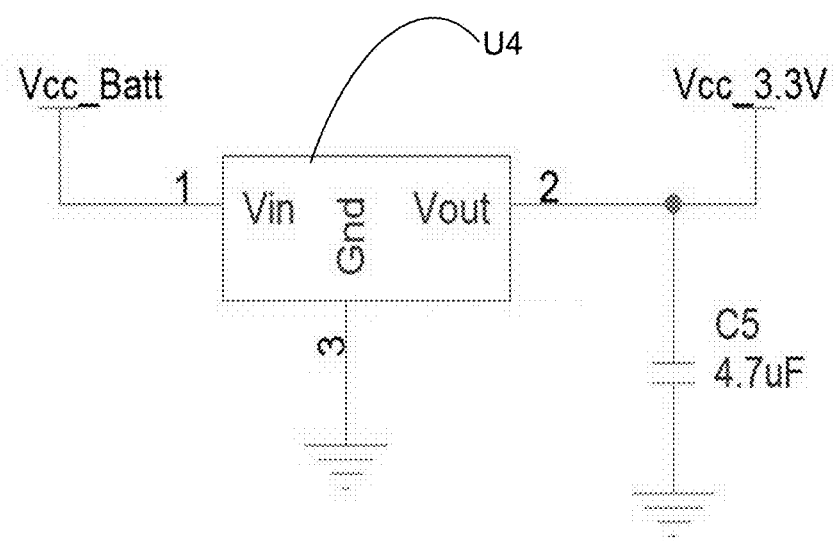
FIG. 8 illustrates a voltage regulator circuit, in accordance with one embodiment of the invention.

FIG. 8 illustrates a voltage regulator circuit, in accordance with one embodiment of the invention. This is only one illustrative example of such a circuit, because other embodiments of this circuit could be implemented with other components and/or component values and/or voltages. This particular circuit includes an IC regulator component U4 (e.g., AP7313-3.3, or an equivalent) with pins respectively coupled to Vcc of the battery, Vcc of 3.3 volts, ground, and capacitor C5 that is coupled to ground. In one embodiment, C5 has a capacitance of 4.7 microFarads, but other embodiments can have a larger or smaller capacitance.

Figure 9:
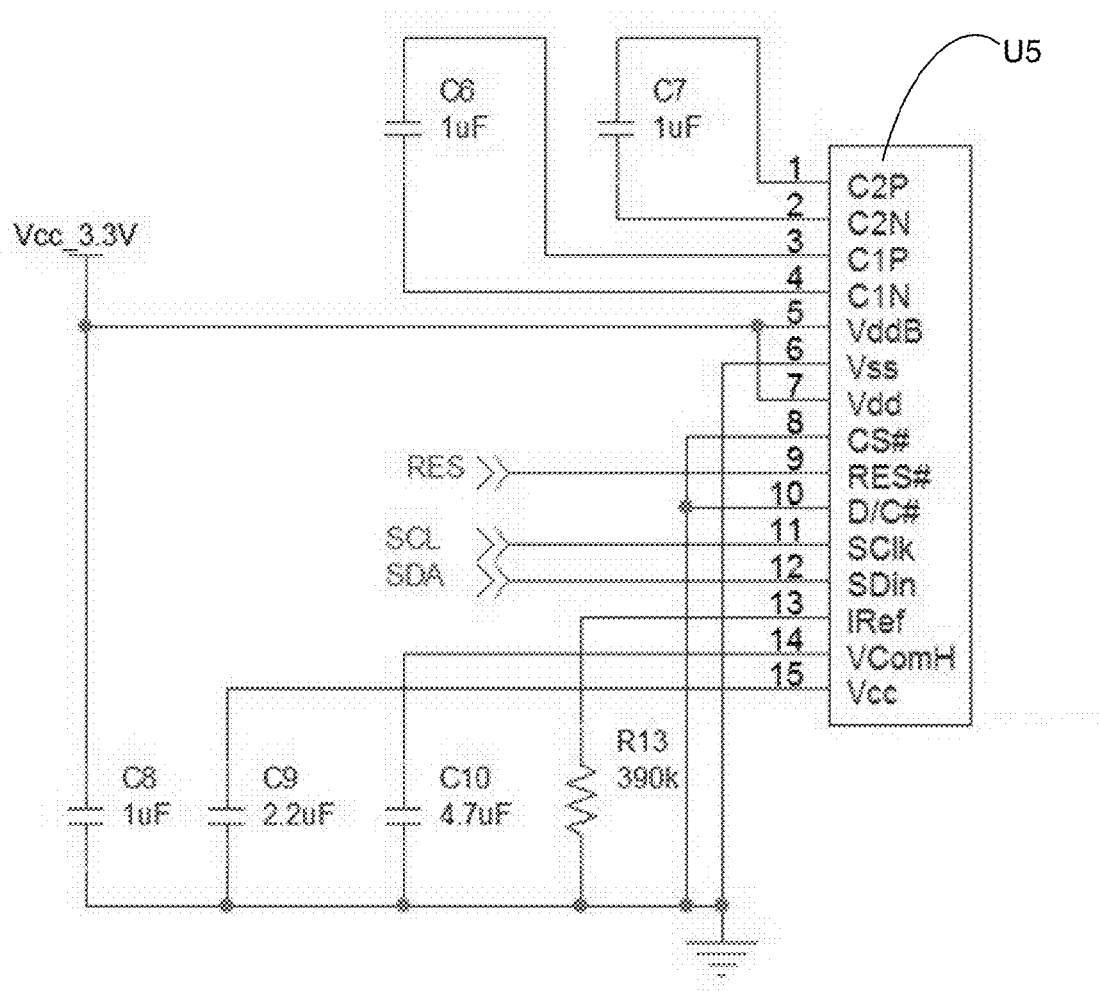
FIG. 9 illustrates an OLED display circuit, in accordance with one embodiment of the invention.

FIG. 9 illustrates an OLED display circuit, in accordance with one embodiment of the invention. This is only one illustrative example of such a circuit, because other embodiments of this circuit could be implemented with other components and/or component values and/or voltages. This particular circuit includes an IC component U5 (e.g., UG-2832HSWEG04, or an equivalent) with pins coupled to capacitors C6, C7, C8, C9, C10 and resistor R13, with two pins coupled to Vcc, one pin coupled to ground and three pins coupled to signals RES, SCL, and SDA, respectively. Capacitors C8, C9, C10 and resistor R13 are also coupled to ground.

Figure 10:
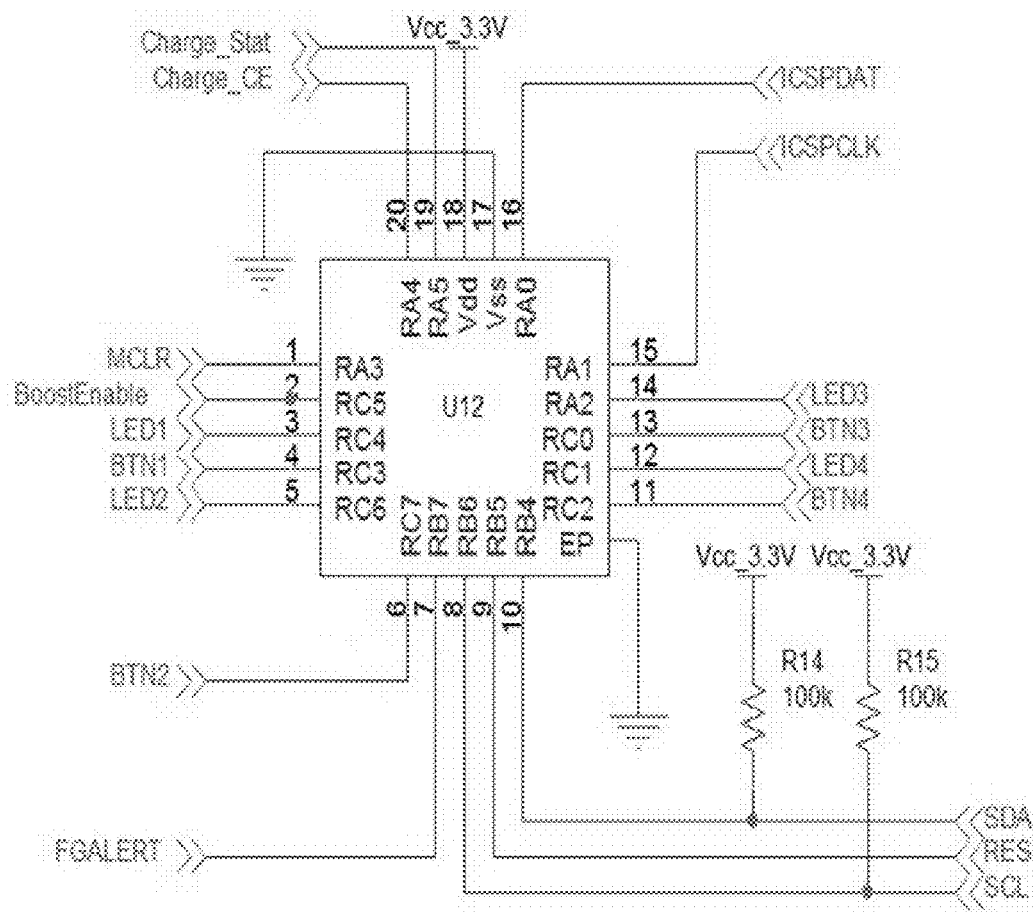
FIG. 10 illustrates a micro-controller circuit, in accordance with one embodiment of the invention.

FIG. 10 illustrates a micro-controller circuit, in accordance with one embodiment of the invention. This is only one illustrative example of such a circuit, because other embodiments of this circuit could be implemented with other components and/or component values and/or voltages. This particular circuit includes a micro-controller U12 (e.g., PIC16F1828, or an equivalent) with pins coupled to resistor R14 and R15 that are respectively coupled to Vcc, and with one pin coupled to Vcc, two pins coupled to ground, pins coupled to Charge_Stat, Charge_CE, ICSPDAT, ICSPCLK, MCLR, BoostEnable, LED1, BTN1, LED2, BTN2, FGALERT, LED3, BTN3, LED4, BTN4, and pins coupled to signals RES, SCL, and SDA, respectively previously seen in FIG. 9.

Figure 11:
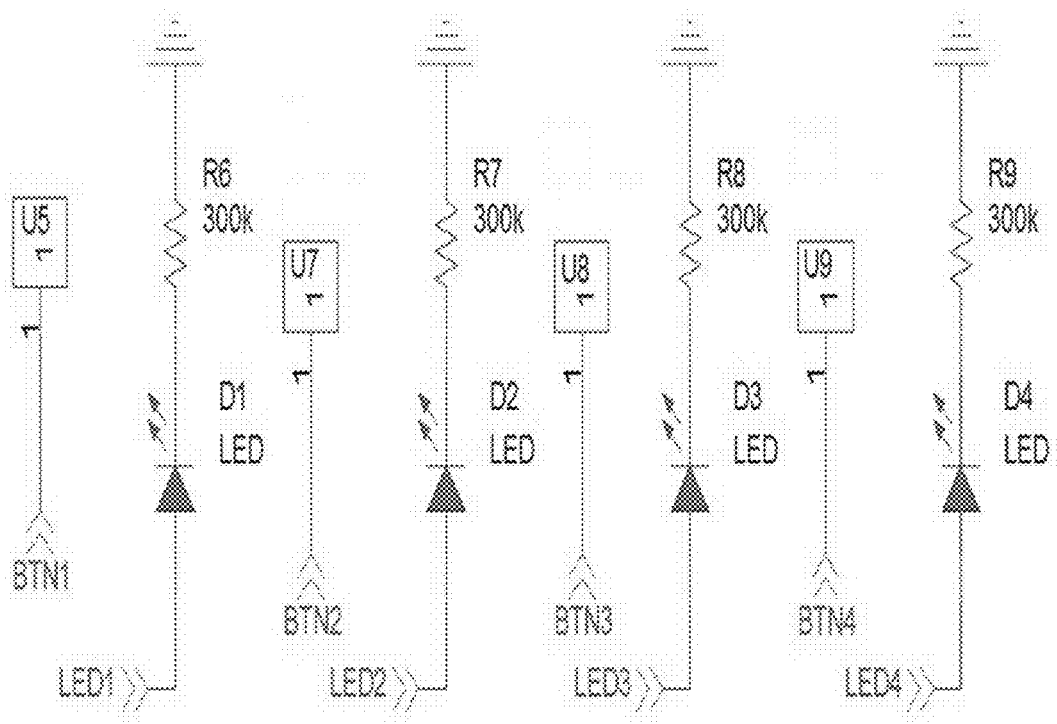
FIG. 11 illustrates a LED/Button interface circuit, in accordance with one embodiment of the invention.

FIG. 11 illustrates an LED/Button interface circuit, in accordance with one embodiment of the invention. This is only one illustrative example of such a circuit, because other embodiments of this circuit could be implemented with other components and/or component values and/or voltages. This particular circuit includes a U5 Button1 coupled to BTN1, a D1 LED coupled to LED1, with a resistor R6 that is coupled to ground; a U7 Button2 coupled to BTN2, a D2 LED coupled to LED2, with a resistor R7 that is coupled to ground; a U8 Button3 coupled to BTN3, a D3 LED coupled to LED3, with a resistor R8 that is coupled to ground; a U9 Button4 coupled to BTN4, a D4 LED coupled to LED4, with a resistor R9 that is coupled to ground. In this embodiment, resistors R6, R7, R8, and R9 have a resistance of 300 kiloOhms, but other embodiments can have larger or smaller resistances.

Figure 12:
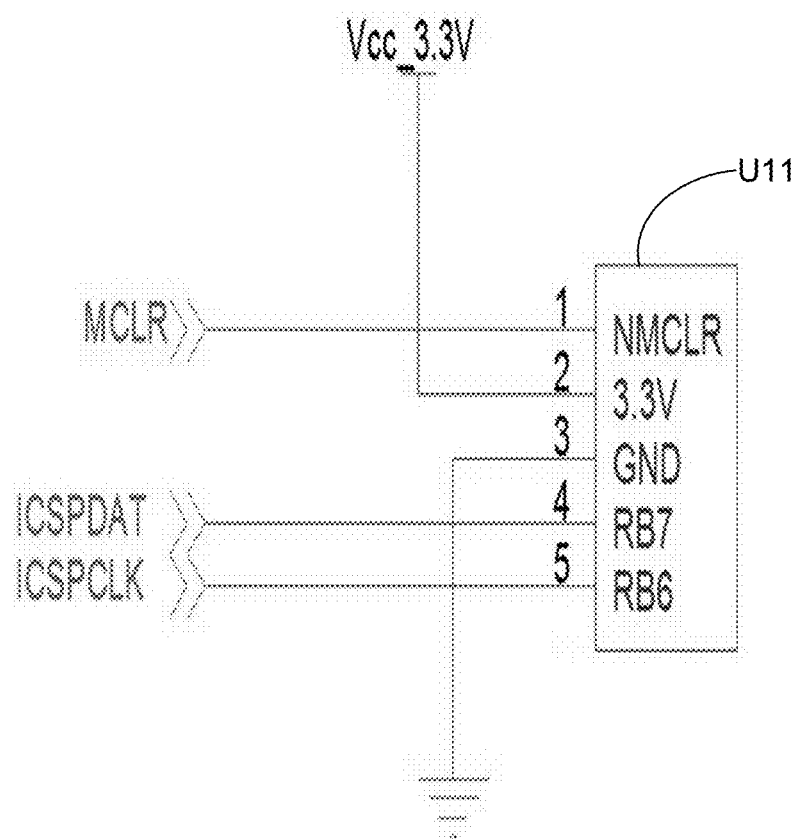
FIG. 12 illustrates an ICSP header circuit, in accordance with one embodiment of the invention.

FIG. 12 illustrates an ICSP header circuit, in accordance with one embodiment of the invention. This is only one illustrative example of such a circuit, because other embodiments of this circuit could be implemented with other components and/or component values and/or voltages. This particular circuit includes an IC component U11 (e.g., ICD_Header, or an equivalent) with one pin coupled to Vcc, one pin coupled to ground and three pins coupled to signals MCLR, ICSPDAT, and ICSPCLK, respectively.

Figure 13:
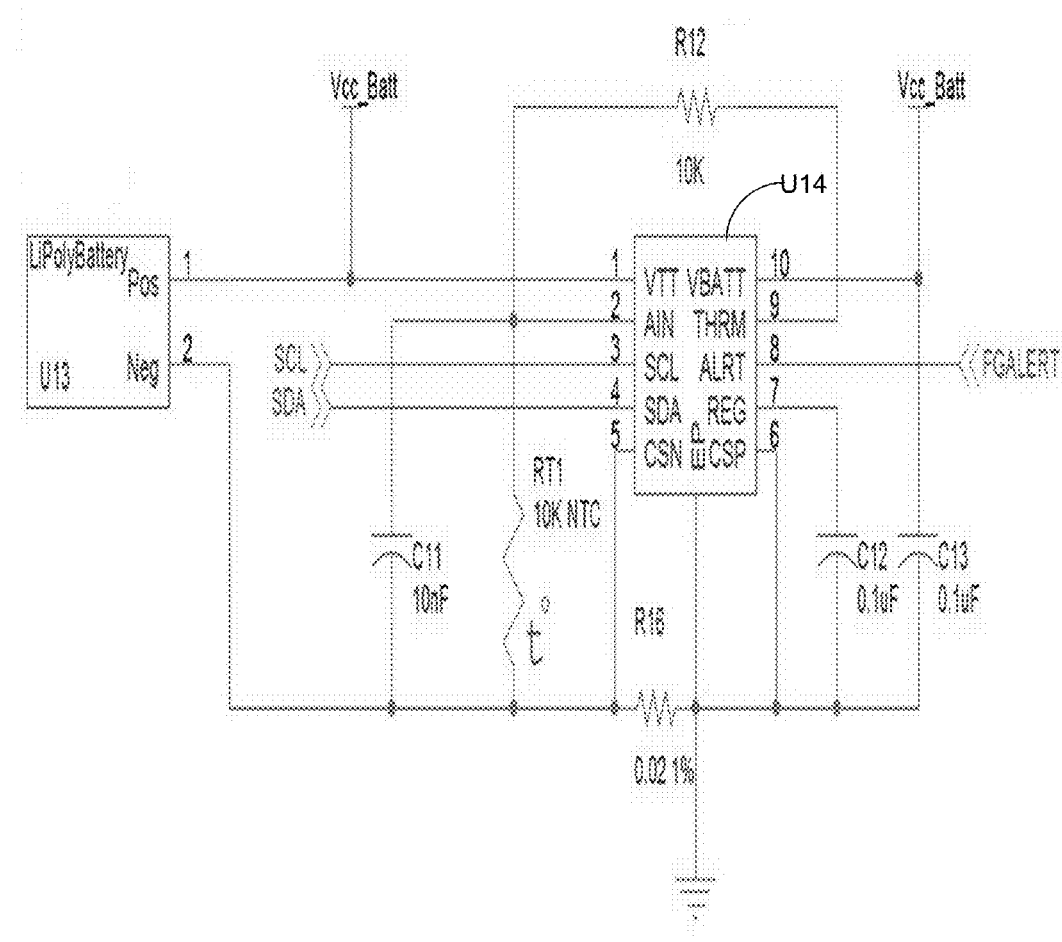
FIG. 13 illustrates a battery gauge circuit, in accordance with one embodiment of the invention.

FIG. 13 illustrates a battery gauge circuit, in accordance with one embodiment of the invention. This is only one illustrative example of such a circuit, because other embodiments of this circuit could be implemented with other components and/or component values and/or voltages. This particular circuit includes a battery component U13 (a lithium polymer battery in one embodiment), an IC component U14 (or an equivalent) with pins coupled to capacitors C11, C12, C13, resistors R12 and current sense resistor R16, a thermsistor (RT1 10K NTC, or an equivalent) with two pins coupled to Vcc_Batt, one pin coupled to ground and pins coupled to signals FGALERT, SCL, and SDA, respectively. Capacitors C8, C9, C10 and resistor R13 are also coupled to ground.

Figure 14:
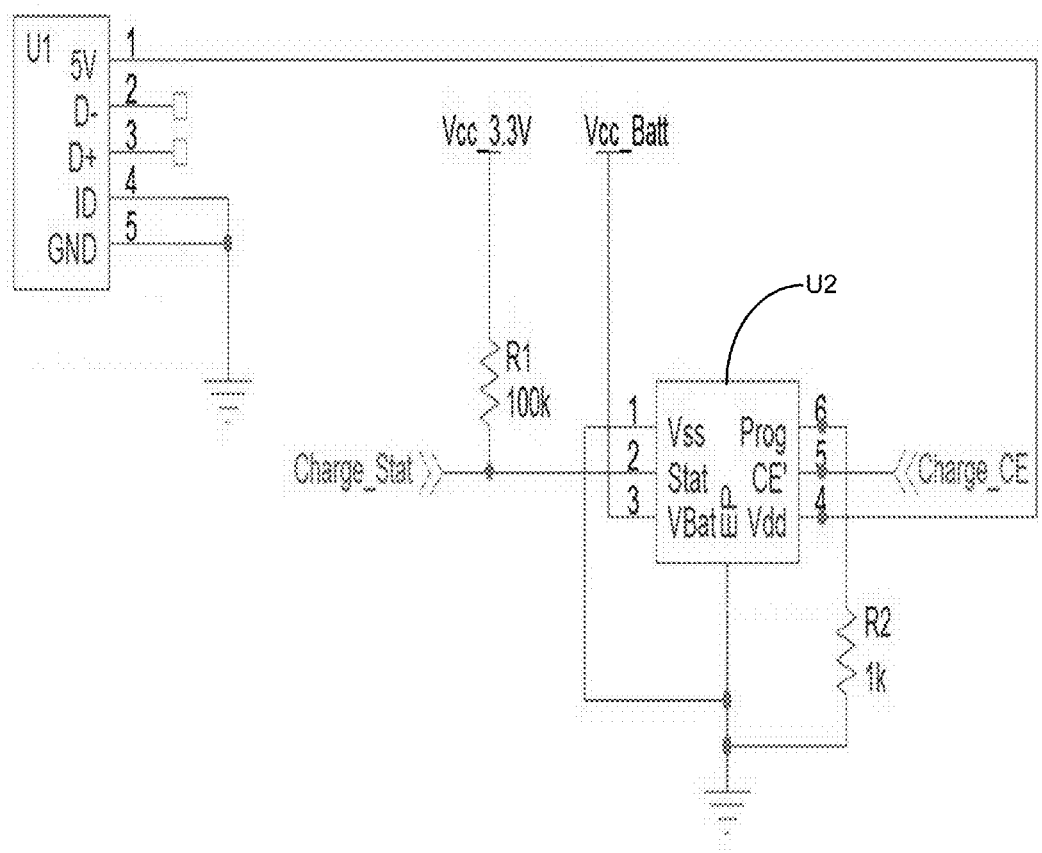
FIG. 14 illustrates a charger circuit, in accordance with one embodiment of the invention.

FIG. 14 illustrates a charger circuit, in accordance with one embodiment of the invention. This is only one illustrative example of such a circuit, because other embodiments of this circuit could be implemented with other components and/or component values and/or voltages. This particular circuit includes a USB Micro Female connector U1, and an IC component U2 (MCP73830/L, or an equivalent) with pins coupled to resistors R1 and R2, with one pin coupled to Vcc_Batt, one pin coupled to ground, one pin coupled to the 5 volt pin of the USB Micro Female connector U1, and two pins coupled to signals Charge_Stat and Charge_CE, respectively. Resistor R1 is coupled to Vcc_3.3V and Charge_Stat, and resistor R2 is coupled to ground and also coupled to one pin of the U2 component. Two pins of the USB Micro Female connector are also coupled to ground.

Figure 15:
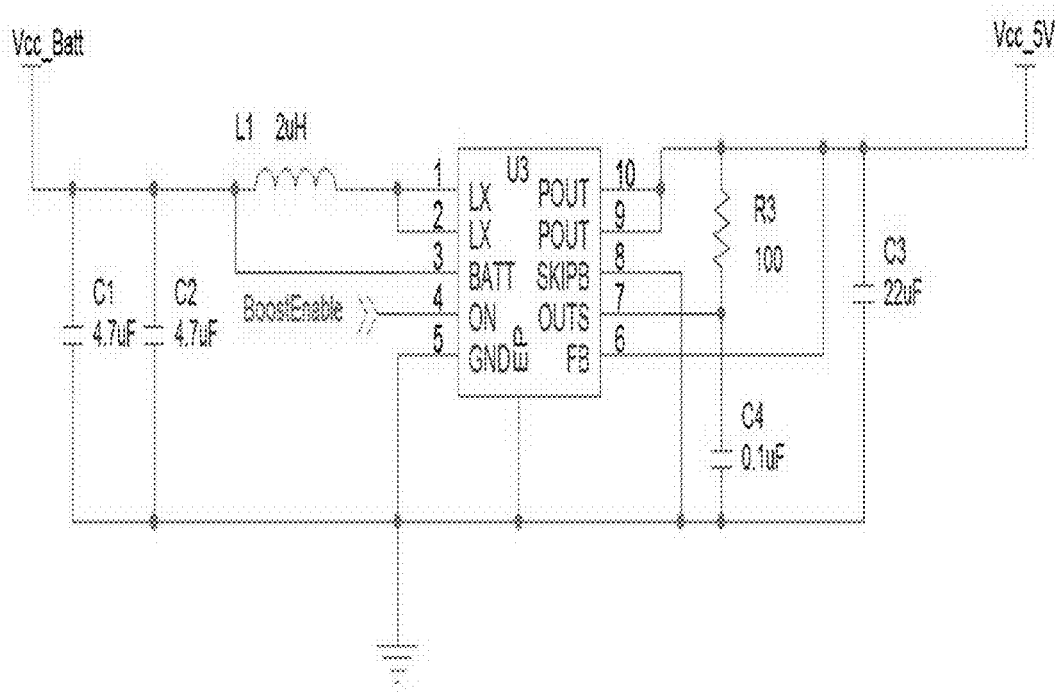
FIG. 15 illustrates a boost circuit, in accordance with one embodiment of the invention.

FIG. 15 illustrates a boost circuit, in accordance with one embodiment of the invention. This is only one illustrative example of such a circuit, because other embodiments of this circuit could be implemented with other components and/or component values and/or voltages. This particular circuit includes an IC component U3 (MAX8815A, or an equivalent) with pins coupled to capacitors C1, C2, C3, C4, resistor R3, inductor L1, with one pin coupled to Vcc_Batt, two pins coupled to Vcc_5V, one pin coupled to ground, and one pin coupled to signal BoostEnable. Capacitors C1, C2, C3, and C4 are coupled to ground, capacitors C1 and C1 and inductor L1 are coupled to Vcc_Batt, and resistor R3 and C3 are coupled to Vcc_5V. In this embodiment, C1 and C2 have a capacitance of 4.7 microFarads, C3 has a capacitance of 0.1 microFarads, C4 has a capacitance of 22 microFarads, R3 has a resistance of 100 Ohms, L1 has an inductance of 2 micro-Henries, but other embodiments can have components with larger or smaller capacitances, resistances, and inductances.

In one embodiment, the electricity is carried by one wire, and the electrical ground is carried by two wires. In another embodiment, simply two wires (one wire for the electricity and one wire for ground) are used. In alternative embodiments more electrical wires can be used. In one embodiment, there is a controller module that has an on-off switch and a charger port for charging a plurality of internal batteries.

One embodiment of the invention provides electricity to a device (e.g., such as the iPhone/iPod Touch/iPad, Android, a tablet computer, a PC, or an equivalent). Various embodiments of the invention can utilize compelling interfaces that people want to use to interface their battery electricity to technology devices.

The energy source in various embodiments can be one or more batteries, a photovoltaic electrical module, an electrical recharger, or some other equivalent electrical energy source with a capacity for supplying an appropriate amount of voltage and current. One embodiment of the invention uses one or more electrochemical batteries (e.g., lithium ion batteries, typically rated at 3.6 volts under normal conditions and 4.2 volts when fully charged, or other equivalent electrochemical batteries, either single charge or rechargeable, or other equivalent power sources). Most of the electrical power provided by such batteries will be used for supply power to operate electronics, and to operate the display and microprocessor/micro-controller.

Figure 16:
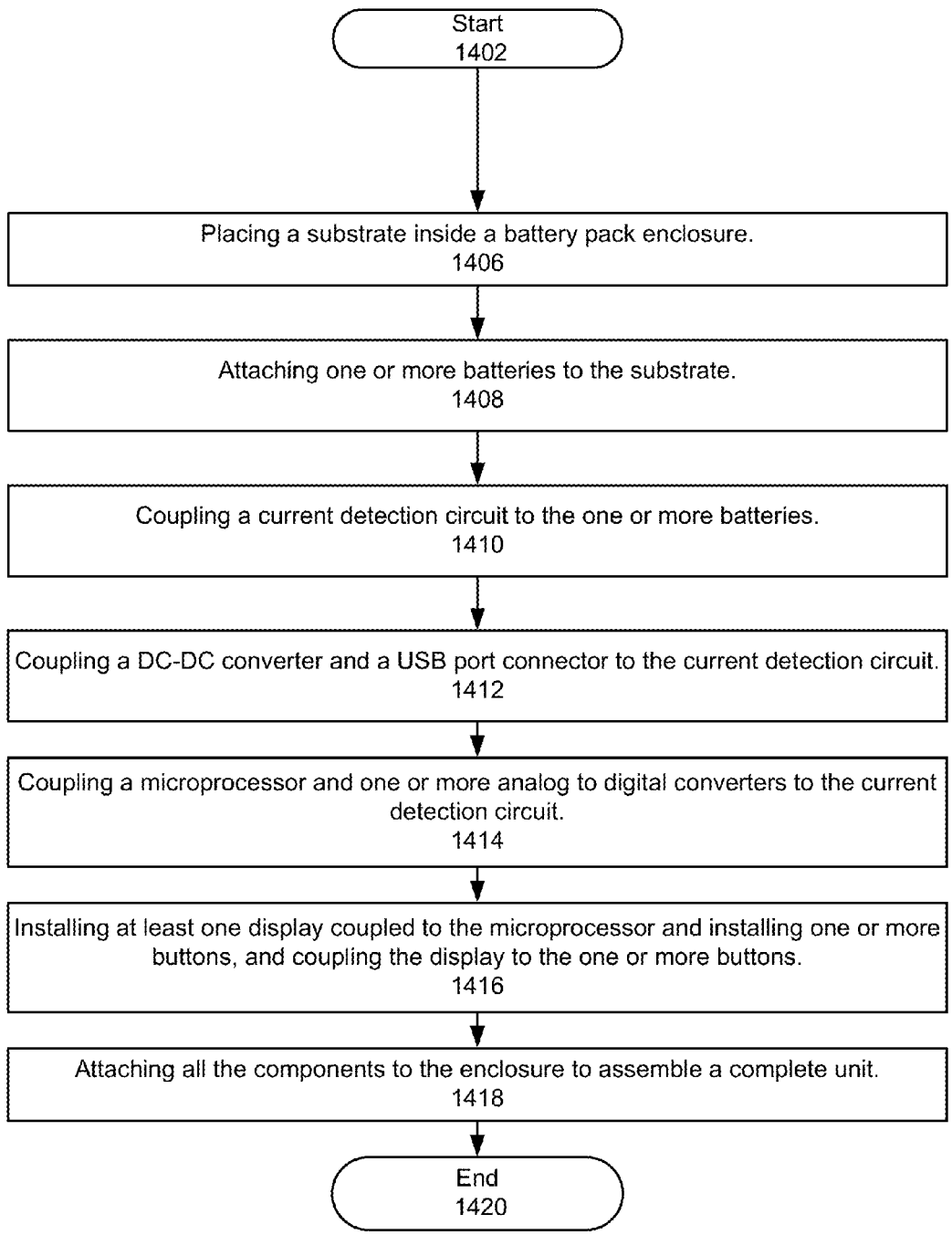
FIG. 16 illustrates a flowchart to make a battery pack with intelligent display, in accordance with one embodiment of the invention.

FIG. 16 illustrates a flowchart to make battery pack with intelligent display, in accordance with one embodiment of the invention. The method starts in operation 1402. Operation 1406 is next and includes placing a substrate inside a battery pack enclosure. Operation 1408 is next and includes attaching one or more batteries to the substrate. Operation 1410 is next and includes coupling a current detection circuit to the one or more batteries. Operation 1412 is next and includes coupling a DC-DC converter and a port connector (e.g., USB, FireWire, or an equivalent port connector) to the current detection circuit. Operation 1414 is next and includes coupling a microprocessor/micro-controller and one or more analog to digital converters to the current detection circuit. In one embodiment, the microprocessor/micro-controller can calculate estimated remaining battery life, current drain on the one or more batteries, clock time, and/or other equivalent parameters as previously described. Operation 1416 is next and includes installing at least one display coupled to the microprocessor/micro-controller and installing one or more buttons, and coupling the at least one display to the one or more buttons. The source of electricity for the at least one display would be the one or more batteries in one embodiment of the invention. Operation 1418 is next and includes attaching all the components to the enclosure to assemble a complete unit. The method ends in operation 1420.

Figure 17:
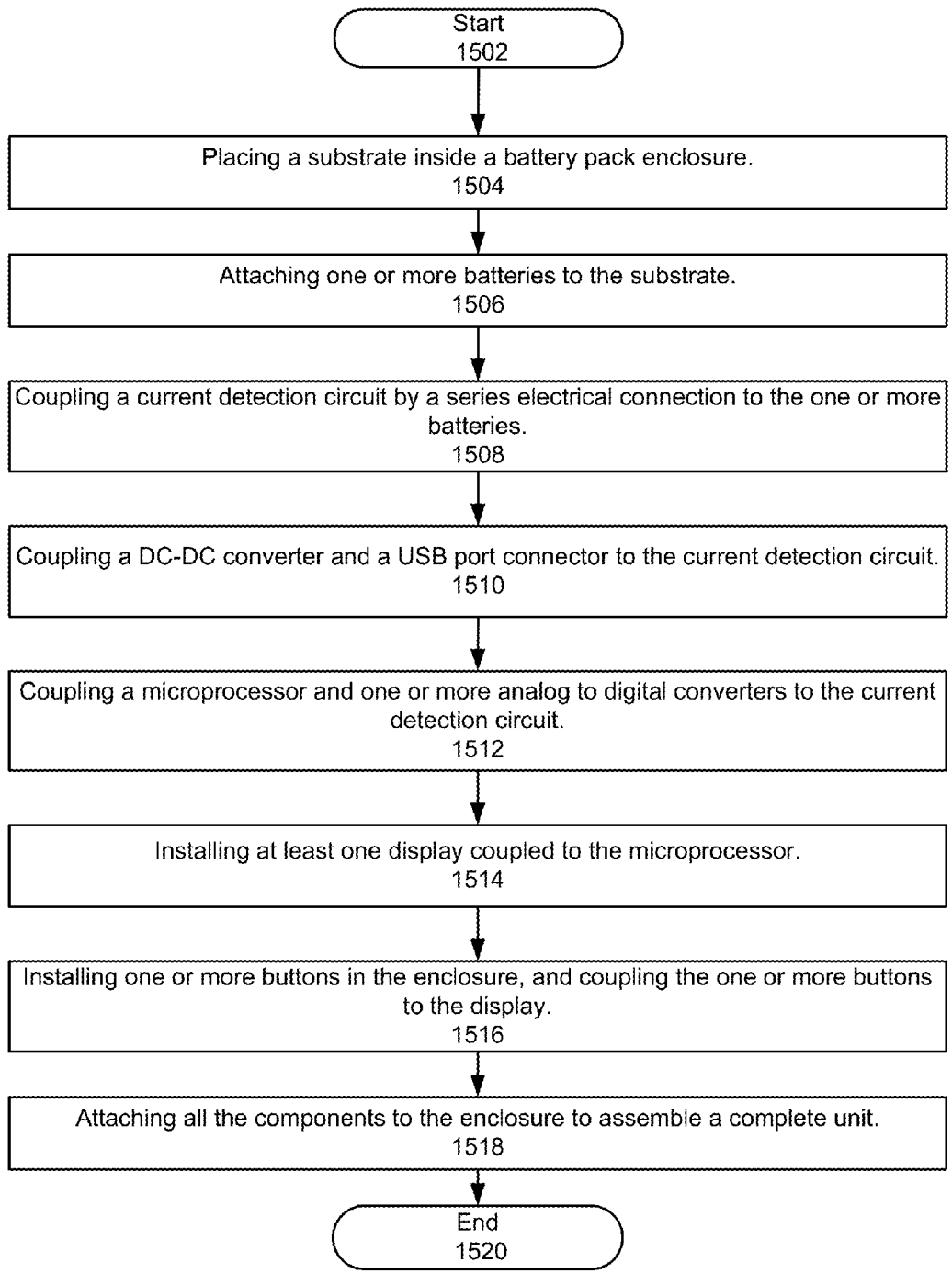
FIG. 17 illustrates a flowchart to make a battery pack with intelligent display, in accordance with one embodiment of the invention.

FIG. 17 illustrates a flowchart to make battery pack with intelligent display, in accordance with another embodiment of the invention. The method starts in operation 1502. Operation 1504 is next and includes placing a substrate inside a battery pack enclosure. Operation 1506 is next and includes attaching one or more batteries to the substrate. Operation 1508 is next and includes coupling a current detection circuit by a series electrical connection to the one or more batteries. Operation 1510 is next and includes coupling a DC-DC converter and a port connector (e.g., USB, FireWire, or an equivalent port connector) to the current detection circuit. Operation 1512 is next and includes coupling a microprocessor/micro-controller and one or more analog to digital converters to the current detection circuit. Operation 1514 is next and includes installing at least one display coupled to the microprocessor/micro-controller. Operation 1516 is next and includes installing one or more buttons in the enclosure, and coupling the one or more buttons to the display. The source of electricity for the at least one display would be the one or more batteries in one embodiment of the invention. Operation 1518 is next and includes attaching all the components to the enclosure to assemble a complete unit. The method ends in operation 1520.

Other embodiments of the invention are possible. For example, the battery pack with intelligent display could be composed of several laminations of various materials for different applications. Another embodiment of the invention could provide multiple adjustable connectors to accommodate different sizes and lengths of electronics, energy sources, and cords.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A battery pack with intelligent display, comprising:
a substrate, including at least one ground pin and at least one Vcc voltage pin, inside a battery pack enclosure including a top part and a bottom part of the battery pack enclosure and a seal to seal the top part and the bottom part of the battery pack enclosure;
one or more batteries attached to the substrate;
a current detection circuit, including at least one precision resistor, coupled to the one or more batteries;
a DC-DC converter and a port connector coupled to the current detection circuit;
one or more connectors to the battery pack to charge and discharge the one or more batteries;
a charger circuit to charge the one or more batteries;
a temperature sensor to monitor for temperature variations of the one or more batteries;
a microprocessor/micro-controller and one or more analog to digital converters coupled to the current detection circuit, wherein the microprocessor/micro-controller can also calculate the age of the battery pack and a charge current in to the battery pack;
at least one display coupled to the microprocessor/micro-controller, wherein the at least one display displays at least one alpha-numeric battery parameter in addition to battery charging capacity and battery voltage, wherein the at least one display also displays the age of the battery pack or the charge current in to the battery pack; and
one or more buttons in the battery pack enclosure, wherein the one or more buttons are coupled to the display and microprocessor/micro-controller.

2. The battery pack of claim 1, wherein the current detection circuit is in an electrical series connection to the one or more batteries.

3. The battery pack of claim 1, wherein the microprocessor/micro-controller is a microprocessor/micro-controller comprising the one or more analog to digital converters.

4. The battery pack of claim 1, wherein the at least one display includes a LCD display.

5. The battery pack of claim 1, wherein the at least one display includes an LED display.

6. The battery pack of claim 1, wherein the at least one display includes an OLED display.

7. The battery pack of claim 1, wherein the charger circuit acts to charge the one or more batteries and to regulate the recharging of the one or more batteries from an external source of electricity.

8. The battery pack of claim 1, wherein one connector of the one or more connectors to the battery pack acts to charge the one or more batteries from an 18 volt source of electricity separate from the battery pack enclosure.

9. The battery pack of claim 1, wherein the one or more buttons include one or more capacitive sense touch buttons.

10. The battery pack with intelligent display of claim 1, wherein the at least one display includes a display to display at least one parameter selected from the group of parameters consisting of: charge remaining, current out, watts out, watts in, time remaining, time to recharge the one or more batteries, battery temperature, battery voltage, degradation of the battery, and clock time.

11. A battery pack with intelligent display, comprising:
a substrate, including at least one ground pin and at least one Vcc voltage pin, inside a battery pack enclosure including a top part and a bottom part of the battery pack enclosure and a seal to seal the top part and the bottom part of the battery pack enclosure;
one or more batteries attached to the substrate;
a current detection circuit, including at least one precision resistor, coupled to the one or more batteries;
a DC-DC converter and a port connector coupled to the current detection circuit;
one or more connectors to the battery pack to charge and discharge the one or more batteries;
a charger circuit to charge the one or more batteries;
a temperature sensor to monitor for temperature variations of the one or more batteries;
a USB connector coupled to two resistors that are each respectively coupled to the at least one Vcc voltage pin, and wherein the USB connector is also coupled to two resistors that are each respectively coupled to the at least one ground pin;

a microprocessor/micro-controller and one or more analog to digital converters coupled to the current detection circuit, wherein the microprocessor/micro-controller can also calculate the age of the battery pack and a charge current in to the battery pack;

at least one display coupled to the microprocessor/micro-controller, wherein the at least one display displays at least one alpha-numeric battery parameter in addition to battery charging capacity and battery voltage, wherein the at least one display also displays the age of the battery pack or the charge current in to the battery pack; and one or more buttons in the battery pack enclosure, wherein the one or more buttons are coupled to the display and microprocessor/micro-controller.

12. The battery pack of claim 11, wherein the current detection circuit is in an electrical series connection to the one or more batteries.

13. The battery pack of claim 11, wherein the microprocessor/micro-controller is a microprocessor/micro-controller comprising the one or more analog to digital converters.

14. The battery pack of claim 11, wherein the at least one display includes a LCD display.

15. The battery pack of claim 11, wherein the at least one display includes an LED display.

16. The battery pack of claim 11, wherein the at least one display includes an OLED display.

17. The battery pack of claim 11, wherein the charger circuit acts_to charge the one or more batteries and to regulate the recharging of the one or more batteries from an external source of electricity.

18. The battery pack of claim 11, wherein one connector of the one or more connectors to the battery pack acts to charge the one or more batteries from an 18 volt source of electricity separate from the battery pack enclosure.

19. The battery pack of claim 11, wherein the one or more buttons include one or more capacitive sense touch buttons.

20. The battery pack with intelligent display of claim 11, wherein the at least one display includes a display to display at least one parameter selected from the group of parameters consisting of: charge remaining, current out, watts out, watts in, time remaining, time to recharge the one or more batteries, battery temperature, battery voltage, degradation of the battery, and clock time.

* * * * *